(12) United States Patent
Hanai

(10) Patent No.: US 10,831,429 B2
(45) Date of Patent: Nov. 10, 2020

(54) DISPLAY MODE ADJUSTMENT BASED ON NUMBER OF ESTIMATED FUNCTIONS OF A RECOMMENDED CONTENT

(71) Applicant: TOYOTA JIDOSHA KABUSHIKI KAISHA, Toyota-shi, Aichi-ken (JP)

(72) Inventor: Miharu Hanai, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 61 days.

(21) Appl. No.: 16/123,704

(22) Filed: Sep. 6, 2018

(65) Prior Publication Data
US 2019/0102131 A1    Apr. 4, 2019

(30) Foreign Application Priority Data
Oct. 4, 2017   (JP) ................. 2017-194443

(51) Int. Cl.
G06F 3/14         (2006.01)
H04W 8/24         (2009.01)
H04N 21/466       (2011.01)

(52) U.S. Cl.
CPC .......... *G06F 3/1423* (2013.01); *G06F 3/1454* (2013.01); *H04N 21/4668* (2013.01); *H04W 8/24* (2013.01); *G09G 2340/145* (2013.01); *G09G 2350/00* (2013.01); *G09G 2354/00* (2013.01)

(58) Field of Classification Search
None
See application file for complete search history.

(56) References Cited

U.S. PATENT DOCUMENTS

2006/0155665 A1    7/2006   Sekiyama
2011/0161855 A1*   6/2011   Prehofer ........... H04M 1/72572
                                              715/771
2012/0304087 A1*  11/2012   Walkin ................ H04L 12/1813
                                              715/764

FOREIGN PATENT DOCUMENTS

JP          2006195578 A     7/2006

* cited by examiner

*Primary Examiner* — Abdullah Al Kawsar
*Assistant Examiner* — David V Luu
(74) *Attorney, Agent, or Firm* — Hunton Andrews Kurth LLP

(57) ABSTRACT

A non-transitory computer readable medium stores a program causing a computer to function as units including a reception unit configured to receive an input content from a user; a first screen control unit configured to display a content of a recommendation on a first screen; a second screen control unit configured to generate a second screen of a function estimated or determined from the content of the recommendation and to dispose the second screen on a back of the first screen; and a determination unit configured to determine a display mode of the second screen such that the display mode of the second screen of the estimated function is different from that of the second screen of the determined function. The first screen control unit is configured to change a transmission rate of the first screen such that the display mode is set to the determined display mode.

5 Claims, 8 Drawing Sheets

| NUMBER OF ESTIMATED FUNCTIONS | TRANSMISSION RATE | BACKGROUND FUNCTION | REMARK |
|---|---|---|---|
| 0 | - | ABSENT | EXEMPT |
| 1 | 80% | PRESENT | TRANSMISSION RATE UPPER LIMIT VALUE |
| 2 | 60% | PRESENT | |
| 3 | 40% | PRESENT | |
| 4 | 20% | PRESENT | |
| 5 OR MORE | - | ABSENT | EXEMPT |

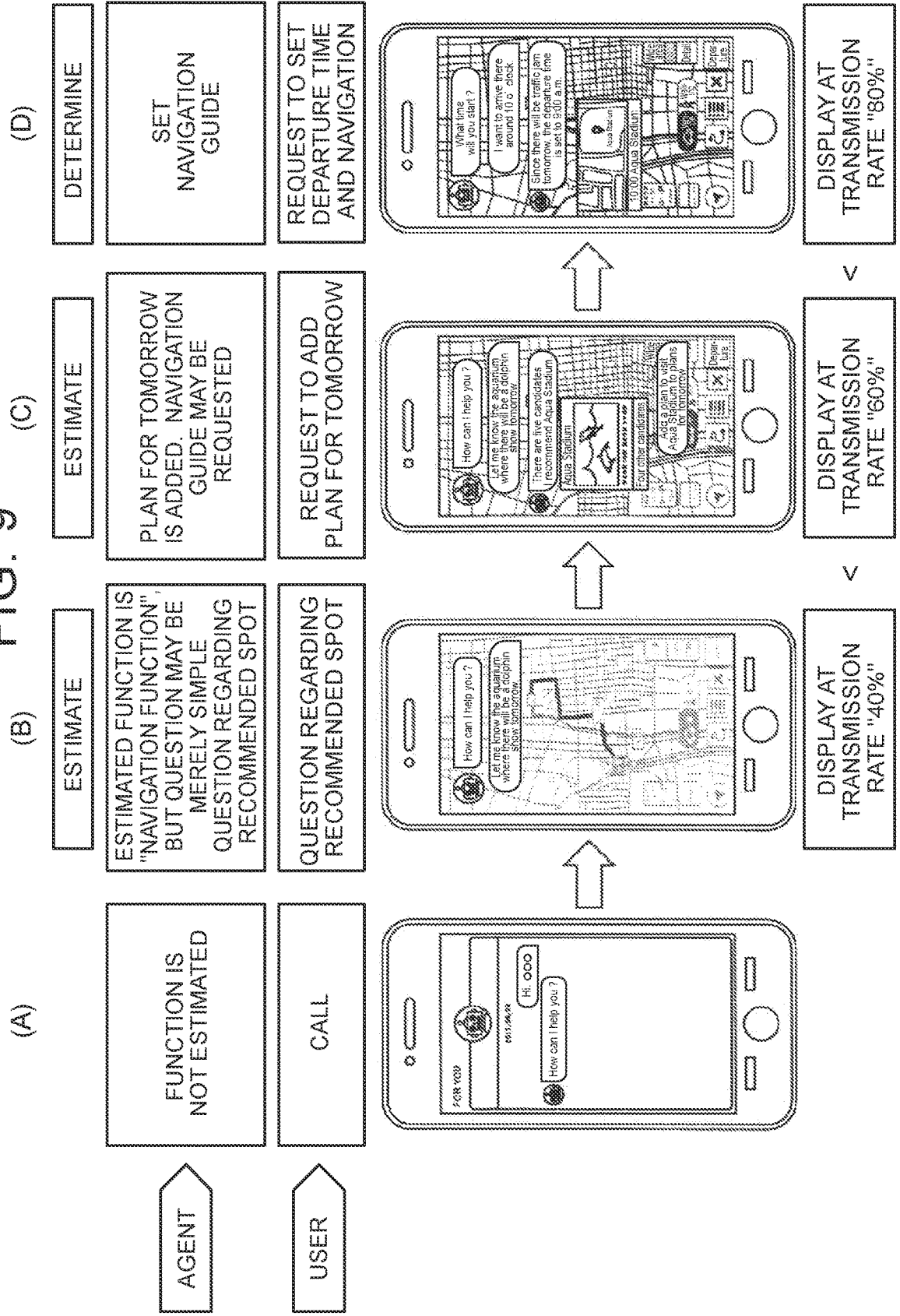

DISPLAY MODE ADJUSTMENT BASED ON NUMBER OF ESTIMATED FUNCTIONS OF A RECOMMENDED CONTENT

INCORPORATION BY REFERENCE

The disclosure of Japanese Patent Application No. 2017-194443 filed on Oct. 4, 2017 including the specification, drawings and abstract is incorporated herein by reference in its entirety.

BACKGROUND

1. Technical Field

The disclosure relates to a non-transitory computer readable medium storing a program, an information processor, and a screen display method.

2. Description of Related Art

Vehicle agent apparatuses, each of which has a function of communicating with an anthropomorphic agent, have been available. Among the vehicle agent apparatuses, the vehicle agent apparatus that recommends optimum information to a user has been available (for example, see Japanese Patent Application Publication No. 2006-195578 (JP 2006-195578 A)).

SUMMARY

Here, the so-called agent is expected to learn various kinds of information such as a personality, behavior, hobbies, and tastes of the user, estimate and recommend the optimum information for the user (information desired by the user). There is a case where an agent in related art needs to receive an input from the user a plurality of times before determining the information desired by the user and performing a recommendation operation. However, in the case where the agent in related art performs the recommendation operation on the basis of an estimation result at an intermediate stage before determining the information desired by the user, a screen or the like may be frequently switched and the user may be confused.

The disclosure provides a non-transitory computer readable medium storing a program, an information processor, and a screen display method, each of which makes it possible to perform a recommendation operation that can be easily comprehended by a user.

A first aspect of the disclosure relates to a non-transitory computer readable medium storing a program causing a computer to function as units including a reception unit configured to receive an input content from a user; a first screen control unit configured to display a content of a recommendation for the input content on a first screen; a second screen control unit configured to generate a second screen of a function estimated or determined from the content of the recommendation for the input content and to dispose the second screen on a back of the first screen; and a determination unit configured to determine a display mode of the second screen such that the display mode of the second screen of the function estimated from the content of the recommendation for the input content is different from the display mode of the second screen of the function determined from the content of the recommendation for the input content. The first screen control unit is configured to change a transmission rate of the first screen such that the display mode of the second screen is set to the display mode determined by the determination unit.

Thus, the second screen can be displayed such that the display mode of the second screen of the function estimated from the content of the recommendation for the input content is different from the display mode of the second screen of the function determined from the content of the recommendation for the input content. Therefore, it is possible to provide the non-transitory computer readable medium storing the program that makes it possible to perform the recommendation operation that can be easily comprehended by the user.

In the above-described aspect, the determination unit may be configured to determine the transmission rate of the first screen in accordance with the number of the estimated or determined functions.

Thus, the transmission rate of the first screen can be determined in accordance with the number of the estimated or determined functions. Therefore, it is possible to provide the non-transitory computer readable medium storing the program that makes it possible to perform the recommendation operation that can be easily comprehended by the user.

In the above-described aspect, the determination unit may be configured to determine the transmission rate of the first screen such that as the number of the estimated or determined functions increases, the transmission rate of the first screen decreases, and as the number of the estimated or determined functions decreases, the transmission rate of the first screen increases.

Thus, the first screen is less likely to transmit the second screen (i.e., the second screen is less visible through the first screen) as the number of the estimated or determined functions increases, and the first screen is more likely to transmit the second screen (i.e., the second screen is more visible through the first screen) as the number of the estimated or confirmed functions decreases. Therefore, it is possible to provide the non-transitory computer readable medium storing the program that makes it possible to perform the recommendation operation that can be easily comprehended by the user.

In the above-described aspect, the first screen control unit may be configured to display the input content from the user on the first screen and to display the content of the recommendation for the input content on the first screen.

Thus, the second screen transmitted by the first screen (i.e., the second screen that is visible through the first screen) can be checked while the input content and the content of the recommendation for the input content are checked on the first screen. Therefore, it is possible to provide the non-transitory computer readable medium storing the program that makes it possible to perform the recommendation operation that can be easily comprehended by the user.

A second aspect of the disclosure relates to an information processor including a reception unit configured to receive an input content from a user; a first screen control unit configured to display a content of a recommendation for the input content on a first screen; a second screen control unit configured to generate a second screen of a function estimated or determined from the content of the recommendation for the input content and to dispose the second screen on a back of the first screen; and a determination unit configured to determine a display mode of the second screen such that the display mode of the second screen of the function estimated from the content of the recommendation for the input content is different from the display mode of the second screen of the function determined from the content of the recommendation for the input content. The first screen control unit is configured to change a transmission rate of the first screen such that the display mode of the second screen is set to the display mode determined by the determination unit.

Thus, the second screen can be displayed such that the display mode of the second screen of the function estimated from the content of the recommendation for the input content is different from the display mode of the second screen of the function determined from the content of the recommendation for the input content. Therefore, it is possible to provide the information processor that makes it possible to perform the recommendation operation that can be easily comprehended by the user.

A third aspect of the disclosure relates to a screen display method including causing a computer to execute a reception procedure of receiving an input content from a user; a first screen control procedure of displaying a content of a recommendation for the input content on a first screen; a second screen control procedure of generating a second screen of a function estimated or determined from the content of the recommendation for the input content and disposing the second screen on a back of the first screen; and a determination procedure of determining a display mode of the second screen such that the display mode of the second screen of the function estimated from the content of the recommendation for the input content is different from the display mode of the second screen of the function determined from the content of the recommendation for the input content. In the first screen control procedure, a transmission rate of the first screen is changed such that the display mode of the second screen is set to the display mode determined in the determination procedure.

Thus, the second screen can be displayed such that the display mode of the second screen of the function estimated from the content of the recommendation for the input content is different from the display mode of the second screen of the function determined from the content of the recommendation for the input content. Therefore, it is possible to provide the screen display method that makes it possible to perform the recommendation operation that can be easily comprehended by the user.

Thus, it is possible to provide the program, the information processor, and the screen display method, each of which makes it possible to perform the recommendation operation that can be easily comprehended by the user.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 is a transition diagram of an example of a screen that is displayed on the user terminal.

DETAILED DESCRIPTION OF EMBODIMENTS

A program stored in a non-transitory computer readable medium, an information processor, and a screen display method according to an embodiment of the disclosure will be described.

Figure 1:
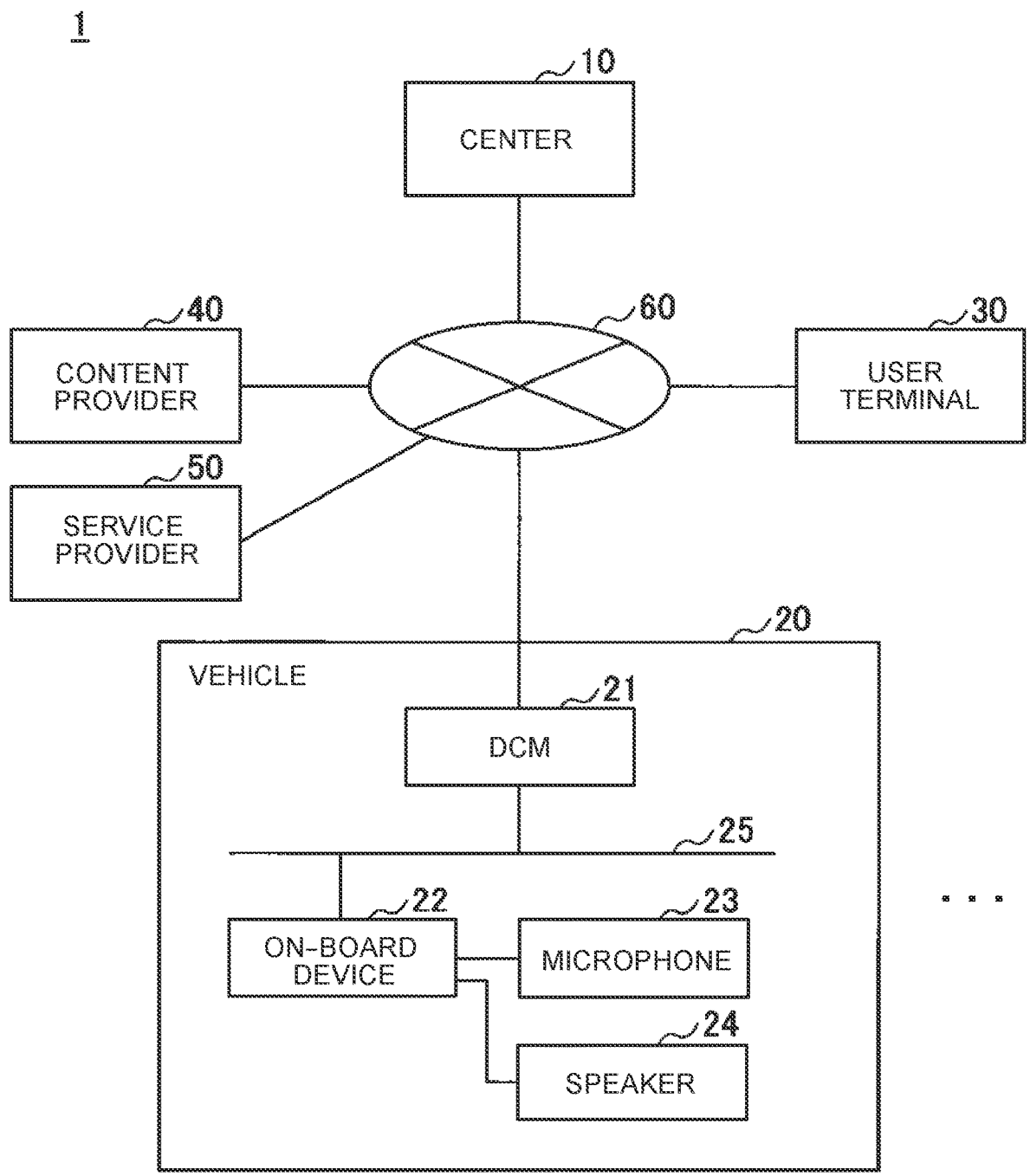
FIG. 1 is a configuration diagram of an example of an information processing system according to an embodiment of the disclosure.

FIG. 1 is a configuration diagram of an example of an information processing system according to the embodiment of the disclosure. An information processing system 1 includes a center 10, a vehicle 20, a user terminal 30, a content provider 40, and a service provider 50. A data communication module (DCM) 21, an on-board device 22, a microphone 23, and a speaker 24 are mounted on the vehicle 20 in FIG. 1. Note that FIG. 1 shows an example in which one vehicle 20, one user terminal 30, one content provider 40, and one service provider 50 are provided. However, one or more vehicles 20, one or more user terminals 30, one or more content providers 40, one or more service providers 50 may be provided.

As an example, the DCM 21 and the on-board device 22 are connected to each other by a controller area network (CAN) 25 such that the DCM 21 and the on-board device 22 can communicate with each other. The microphone 23 and the speaker 24 are directly connected to the on-board device 22. Voice is input to and output from the microphone 23 and the speaker 24. The center 10, the DCM 21 mounted on the vehicle 20, the user terminal 30, the content provider 40, and the service provider 50 are connected to each other via a network 60 such as a mobile communication network or the Internet network.

The center 10 includes one or more computers (one or more information processors). The center 10 collects user's spoken voice data, input character data, or the like from the vehicle 20 or the user terminal 30, comprehends intention of the user's speech or character input, and provides an interactive service, a display service, or the like provided by an agent.

The on-board device 22, which is mounted on the vehicle 20, may be a navigation electronic control unit (i.e., a navigation ECU). The on-board device 22 communicates with the center 10 via the CAN 25, the DCM 21, and the network 60. The DCM 21 is an example of a communication unit or a wireless communication device mounted on the vehicle 20 and makes wireless communication via a communication line such as the third generation (3G) communication line, the Long-Term Evolution (LTE) communication line, the fourth generation (4G) communication line, or the fifth generation (5G) communication line. The user terminal 30 communicates with the center 10 via the network 60 such that the CAN 25 and the DCM 21 are not intervened between the user terminal 30 and the center 10.

Each of the user terminal 30 and the on-board device 22 is a terminal device that is operated by the user. The user terminal 30 is an information processor such as a smartphone, a mobile phone, a tablet computer, a laptop computer, or a personal digital assistant (PDA). An agent application is installed in the user terminal 30 and the on-board device 22. Each of the content provider 40 and the service provider 50 includes one or more computers. In response to a request, the content provider 40 provides various kinds of information as a result, and examples of the various kinds of information include weather data, road data, signboard information, facility information, tourist attractions (sightseeing places), business information, event information, and the like. The service provider 50 provides a result corresponding to the request, to the vehicle 20 or the user terminal 30.

Note that the CAN 25 of the vehicle 20 is merely an example and a bus other than the CAN 25 such as a bus adopting an Ethernet (registered trademark) protocol may be used instead of the CAN 25. In addition, various devices and equipment other than the above-described devices and equipment may be mounted on the vehicle 20.

Figure 2:
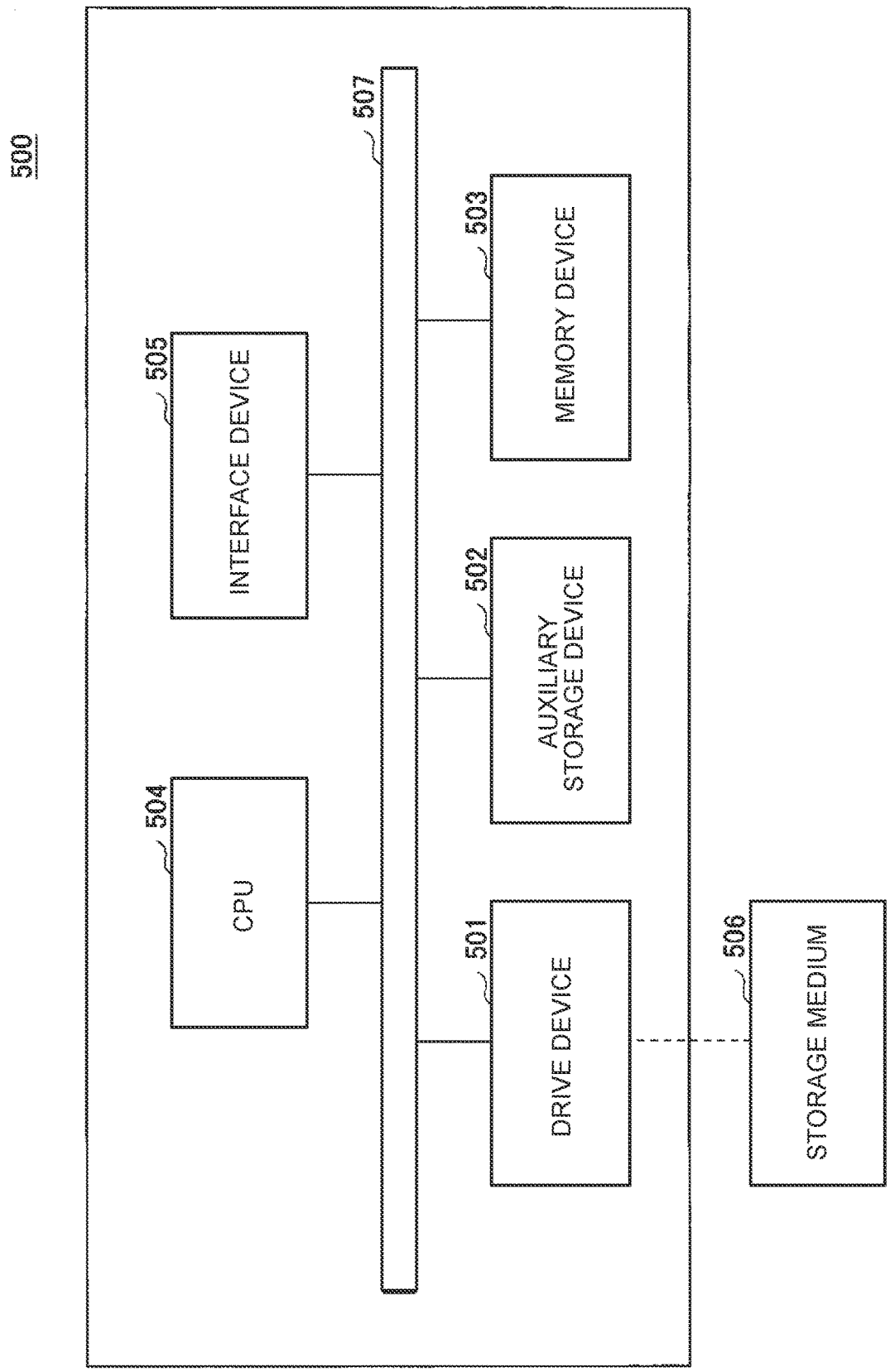
FIG. 2 is a diagram showing a hardware configuration of an example of a computer.

The computer included in each of the center 10, the content provider 40, and the service provider 50 in FIG. 1 has, for example, a hardware configuration as shown in FIG. 2. FIG. 2 is a diagram showing the hardware configuration of an example of the computer.

A computer 500 shown in FIG. 2 includes a drive device 501, an auxiliary storage device 502, a memory device 503, a central processing unit (CPU) 504, an interface device 505, and the like, and these components are connected to each other by a bus 507. The interface device 505 is an interface that connects the computer 500 to the network 60. The auxiliary storage device 502 is an example of a non-volatile storage device that stores a program and data.

The drive device 501 is an interface with a recording medium 506. The computer 500 can read a program and data from the recording medium 506 such as a secure digital (SD) memory card via the drive device 501. The memory device 503 is an example of a volatile semiconductor memory (storage device) that temporarily maintains a program and data.

The CPU 504 executes processing in accordance with the program and the data maintained by the memory device 503. Each of the center 10, the content provider 40, and the service provider 50 in FIG. 1 can implement various kinds of processing as will be described below with the use of, for example, the hardware configuration of the computer 500 shown in FIG. 2.

Figure 3:
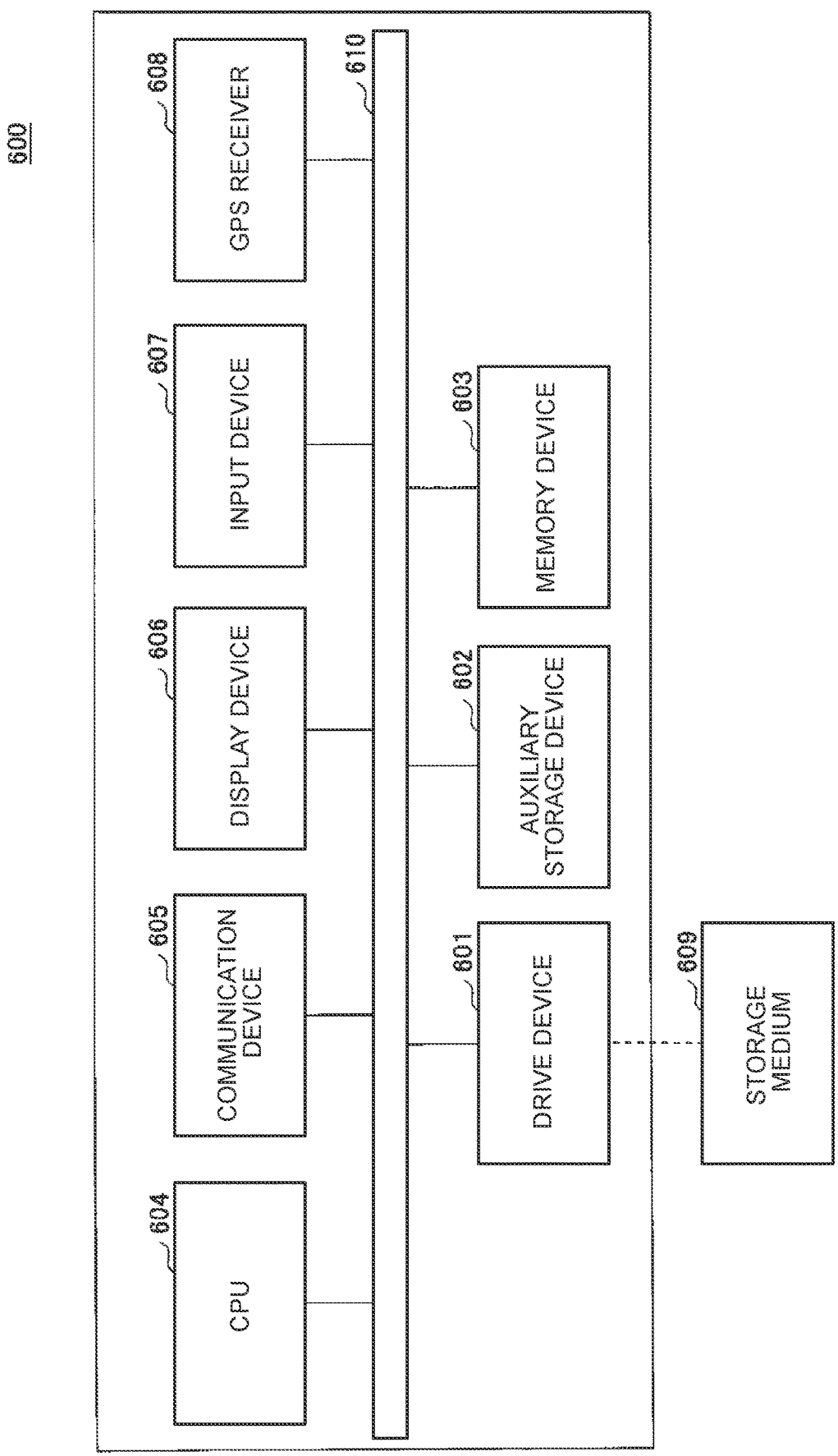
FIG. 3 is a diagram showing a hardware configuration of an example of a computer including a GPS receiver.

A computer 600 included in each of the on-board device 22 and the user terminal 30 in FIG. 1 has, for example, a hardware configuration including a Global Positioning System (GPS) receiver shown in FIG. 3. FIG. 3 is a diagram showing the hardware configuration of an example of the computer including the GPS receiver.

The computer 600 shown in FIG. 3 includes a drive device 601, an auxiliary storage device 602, a memory device 603, a CPU 604, a communication device 605, a display device 606, an input device 607, a GPS receiver 608, and the like, and these components are connected to each other by a bus 610. The drive device 601, the auxiliary storage device 602, the memory device 603, and the CPU 604 are respectively the same as the drive device 501, the auxiliary storage device 502, the memory device 503, and the CPU 504 in FIG. 2.

In the case of the user terminal 30, the communication device 605 is a device that is used to connect the user terminal 30 to the network 60 via the wireless communication. In the case of the on-board device 22, the device that connects the on-board device 22 to the network 60 is the DCM 21, instead of the communication device 605. The display device 606 is a liquid crystal display or the like and is configured to display an agent screen and any of screens with various functions, which will be described below. The input device 607 is a touch screen, an operation button, or the like and is used to receive various input contents from the user. The GPS receiver 608 receives a GPS signal sent from a GPS satellite and measures a current position of the vehicle 20 or the user terminal 30 on the basis of the GPS signal. Each of the on-board device 22 and the user terminal 30 in FIG. 1 can implement various kinds of processing as will be described below with the use of, for example, the hardware configuration of the computer 600 shown in FIG. 3.

Figure 4:
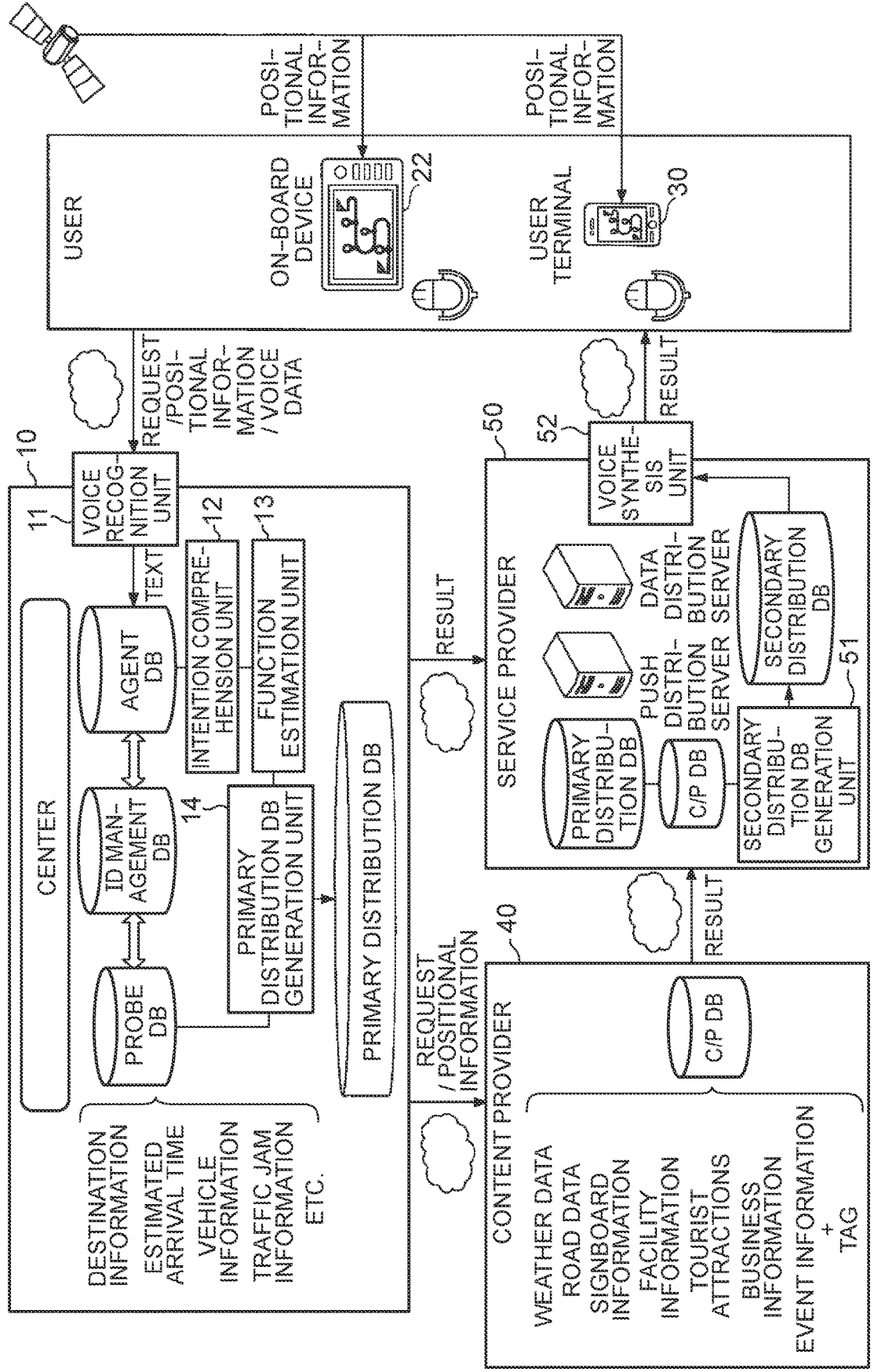
FIG. 4 is a functional configuration diagram of an example that shows some functions of the information processing system according to the embodiment of the disclosure.

In the information processing system 1 according to this embodiment, a function of the agent application, which is installed in the on-board device 22 or the user terminal 30, provides services as will be described below to the user who operates the on-board device 22 or the user terminal 30 by using functions of the center 10, the content provider 40, and the service provider 50 as shown in FIG. 4.

FIG. 4 is a functional configuration diagram of an example that shows some functions of the information processing system according to this embodiment of the disclosure. Each of the on-board device 22 and the user terminal 30 acquires positional information with the use of the GPS receiver 608. When the user has a request to the agent application installed in the on-board device 22 or the user terminal 30, the user speaks thereto or inputs characters therein so as to input the content of the request. Note that a description will hereinafter be provided on the input by the speech as an example; however, the input may be the character input or the like.

The on-board device 22 or the user terminal 30 converts the user's speech to the voice data and sends the voice data and the positional information as the request to the center 10. A voice recognition unit 11 in the center 10 converts the user's voice data to text with the use of, for example, a voice recognition dictionary that is included in an agent database (DB). Note that, because voice recognition processing using the voice recognition dictionary is an existing technology, a description thereon will not be provided.

An intention comprehension unit 12 makes a morphological analysis of the text, into which the voice data has been converted, and comprehends context thereof (e.g., a subject about which an inquiry is made). From the context that has been comprehended or by using an intention comprehension dictionary included in the agent DB, the intention comprehension unit 12 comprehends the intention of the user's speech such as the content of the inquiry or content of a question. In addition, on the basis of the intention of the user's speech (the user's request) that has been comprehended, the intention comprehension unit 12 determines a reply to the user's speech. A function estimation unit 13 estimates one or more functions that correspond to the user's next request from the intention of the user's speech comprehended by the intention comprehension unit 12. In other words, one or more functions are estimated from a content of a recommendation for the input content from the user. The function estimation unit 13 can estimate one or more estimated functions (one or more candidate functions) that correspond to the user's next request on the basis of past records and the like. There may be no estimated function (i.e., no candidate function).

A primary distribution DB generation unit 14 generates a primary distribution DB from databases such as a probe DB and an identification data (ID) management DB. The primary distribution DB is data that is required for generation of screens of the reply to the user's speech, which is determined by the intention comprehension unit 12, and the estimated function, which is estimated by the function estimation unit 13. The probe DB stores probe traffic information that is generated from, for example, the latest traffic information by Vehicle Information and Communication System (VICS) (registered trademark), the past statistical data, and the user's travel information. In addition, in the case where the processing executed by the service provider 50 requires a database stored in the content provider 40, the primary distribution DB generation unit 14 specifies the positional information, requests the database from the content provider 40, and causes the content provider 40 to send the database to the service provider 50 when necessary.

The primary distribution DB generation unit 14 sends, as a result, information on the reply to the user's speech determined by the intention comprehension unit 12 and on the estimated function(s) estimated by the function estimation unit 13 and the generated primary distribution DB to the service provider 50. A secondary distribution DB generation unit 51 in the service provider 50 generates a secondary distribution DB from the primary distribution DB and the database received from the content provider 40.

A voice synthesis unit 52 sends, as a result, the synthesized voice data of the reply to the user's speech determined by the intention comprehension unit 12, the information on the reply to the user's speech determined by the intention comprehension unit 12 and on the estimated function(s) estimated by the function estimation unit 13, and the generated secondary distribution DB to the on-board device 22 or the user terminal 30. The information on the estimated function(s) estimated by the function estimation unit 13 includes the number of the estimated functions and the information on the estimated function with the highest possibility. Note that the reply to the user's speech, the character input, or the like is not limited to the reply provided as the synthesized voice, and may be a reply provided as displayed characters, a displayed image, or the like.

Figure 5:
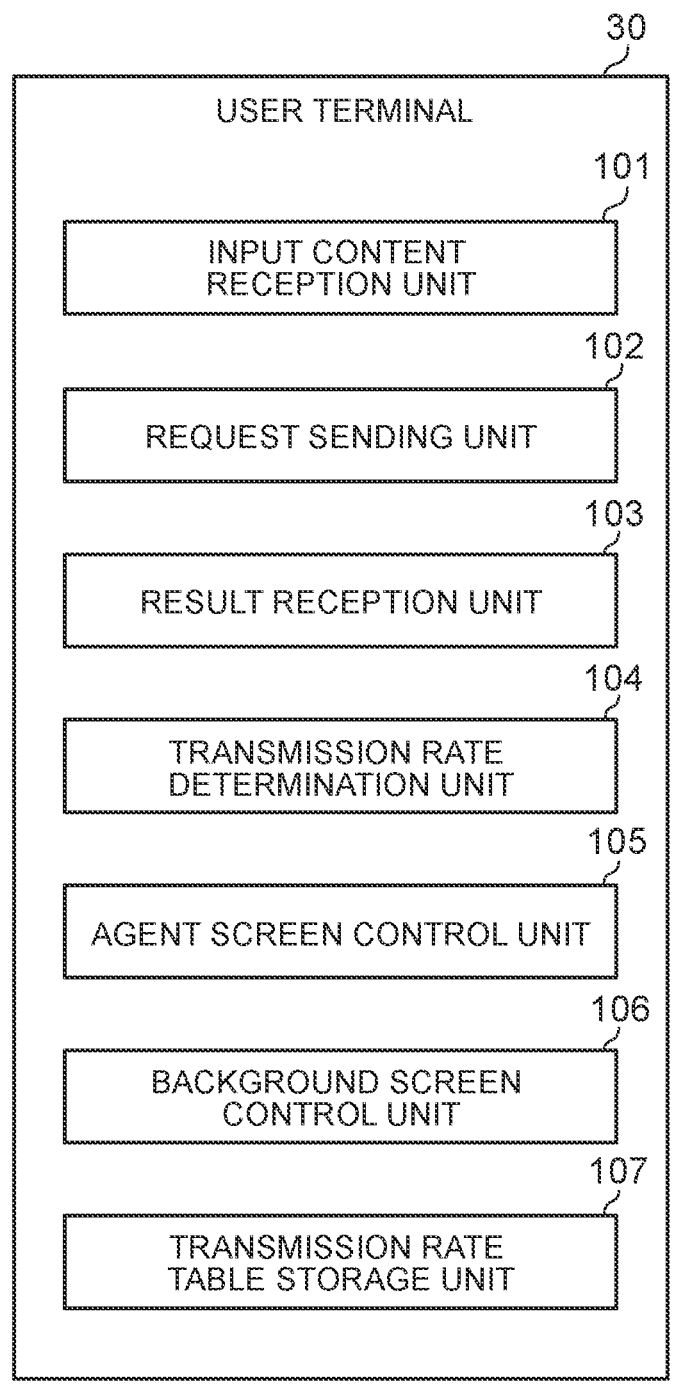
FIG. 5 is a functional configuration diagram of an example of a user terminal according to the embodiment of the disclosure.

When receiving the result of the request from the service provider 50, the on-board device 22 or the user terminal 30 uses functions as shown in FIG. 5 and disposes a screen of the estimated function with the highest possibility on the back of an agent front screen, which will be described below, and changes a transmission rate of the front screen. In this way, the on-board device 22 or the user terminal 30 causes the front screen to transmit the screen of the estimated function with the highest possibility (in other words, the screen of the estimated function with the highest possibility is made visible through the front screen).

In addition, the on-board device 22 or the user terminal 30 changes the transmission rate of the front screen in accordance with, for example, the number of the estimated functions. The on-board device 22 or the user terminal 30 lowers (decreases) the transmission rate as the number of the estimated functions increases, and increases the transmission rate as the number of the estimated functions decreases (as the functions are being narrowed down). In this way, the on-board device 22 or the user terminal 30 allows the user to recognize the next action to be performed by the agent or the agent's comprehension of the user's intention.

Note that the configurations shown in FIG. 1 and FIG. 4 are merely examples and the disclosure is not limited to the configurations shown in FIG. 1 and FIG. 4. For example, a part of, or all of the functions of the content provider 40 may be included in the service provider 50. A part of, or all of the functions of the content provider 40 and/or the service provider 50 may be included in the center 10.

As functional configurations of the on-board device 22 and the user terminal 30, the functional configuration of the user terminal 30 will herein be described as an example. FIG. 5 is a functional configuration diagram of an example of the user terminal according to this embodiment of the disclosure. The user terminal 30 in FIG. 5 includes an input content reception unit 101, a request sending unit 102, a result reception unit 103, a transmission rate determination unit 104, an agent screen control unit 105, a background screen control unit 106, and a transmission rate table storage unit 107.

The input content reception unit 101 receives the input content provided by the speech from the user. The request sending unit 102 sends, as the request, the voice data into which the user's speech has been converted, and the positional information to the center 10. The result reception unit 103 receives, as the result corresponding to the request, the synthesized voice data of the reply to the user's speech determined by the intention comprehension unit 12, and the information on the reply to the user's speech determined by the intention comprehension unit 12 and on the estimated functions estimated by the function estimation unit 13, from the service provider 50.

The transmission rate determination unit 104 reads out the number of the estimated functions from the information on the estimated function(s) estimated by the function estimation unit 13, the information being included in the result. The transmission rate determination unit 104 determines the transmission rate that corresponds to the number of the estimated functions. A transmission rate table, which will be described below, is used to determine the transmission rate. The agent screen control unit 105 controls the display of the display content of the agent front screen and the transmission rate of the front screen through which the background is transmitted (i.e., through which the background is seen). The transmission rate indicates visibility of the background seen through the front screen. Examples of the display content of the front screen (i.e., the content displayed in the front screen) include the text (the input content) into which the user's voice data has been converted, and the reply to the input content.

The background screen control unit 106 selects the estimated function with the highest possibility on the basis of the information on the estimated function(s) estimated by the function estimation unit 13, the information being included in the result. The background screen control unit 106 generates the screen of the selected estimated function on the basis of the secondary distribution DB generated by the service provider 50. Then, the background screen control unit 106 disposes the generated estimated function screen on the back of the agent front screen.

Figures 6, 7:
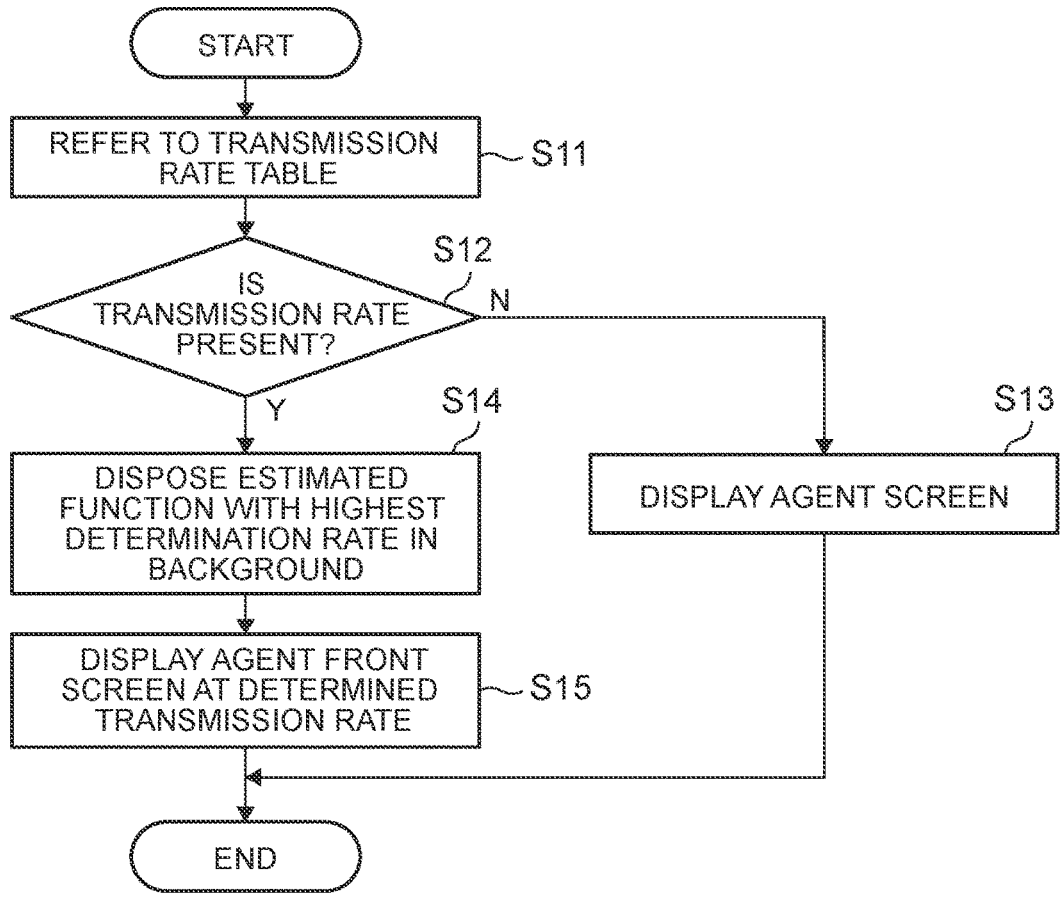
FIG. 6 is a configuration diagram of an example of a transmission rate table.
FIG. 7 is a flowchart of an example of a screen display method.

The transmission rate table storage unit 107 stores the transmission rate table as shown in FIG. 6. FIG. 6 is a configuration diagram of an example of the transmission rate table. In the transmission rate table in FIG. 6, the transmission rate and presence or absence of a background function are stored in relation to the number of the estimated functions. The presence or absence of the background function is information that indicates whether the estimated function screen is disposed on the back of the agent front screen. The background function "ABSENT" indicates that the estimated function screen is not disposed on the back of the agent front screen. The background function "PRESENT" indicates that the estimated function screen is disposed on the back of the agent front screen.

The transmission rate indicates the transmission rate of the front screen through which the background is transmitted (i.e., through which the background is seen). The transmission rate table in FIG. 6 shows an example in which the transmission rate is not set when the number of the estimated functions is "0" and "5 or more" because the background function is "ABSENT". When the number of the estimated functions is "1", the function is determined. Thus, the transmission rate is set to an upper limit value of 80%. When the number of the estimated functions is "2" to "4", the function is not determined. Thus, the transmission rate is set to a value in a range of 60% to 20%. Note that the transmission rate table in FIG. 6 is merely an example. Instead of "-" indicating that the transmission rate is not set, the transmission rate of "0%" may be set.

When receiving the result from the service provider 50, the user terminal 30 controls the screen in a procedure shown in FIG. 7, for example. FIG. 7 is a flowchart of an example of the screen display method. The processing proceeds to step S11, and the transmission rate determination unit 104 refers to, for example, the transmission rate table in FIG. 6. The processing proceeds to step S12, and the transmission rate determination unit 104 determines whether the transmission rate corresponding to the number of the estimated functions is set.

For example, in the case where the number of the estimated functions is "0" or "5 or more" in the transmission rate table in FIG. 6, it is determined that the transmission rate corresponding to the number of the estimated functions is not set. In the case where the number of the estimated functions is "1" to "4" in the transmission rate table in FIG. 6, it is determined that the transmission rate corresponding to the number of the estimated functions is set.

In the case where the transmission rate corresponding to the number of the estimated functions is not set, the transmission rate determination unit 104 determines that the transmission rate is 0%. Then, the processing proceeds to step S13, and the agent front screen is displayed at the transmission rate of 0%. Note that, since the background function is "ABSENT" in the transmission rate table, the estimated function screen is not disposed on the back of the front screen.

In the case where the transmission rate corresponding to the number of the estimated functions is set, the transmission rate determination unit 104 determines the transmission rate that is set in the transmission rate table, as the transmission rate of the agent front screen. Then, the processing proceeds to step S14. In step S14, since the background function is "PRESENT" in the transmission rate table, the background screen control unit 106 disposes the screen of the estimated function with the highest determination rate (i.e., the highest possibility) on the back of the front screen. That is, the estimated function that is disposed in the background has the highest determination rate. Then, the processing proceeds to step S15, and the agent screen control unit 105 displays the agent front screen at the determined transmission rate.

Figure 8:
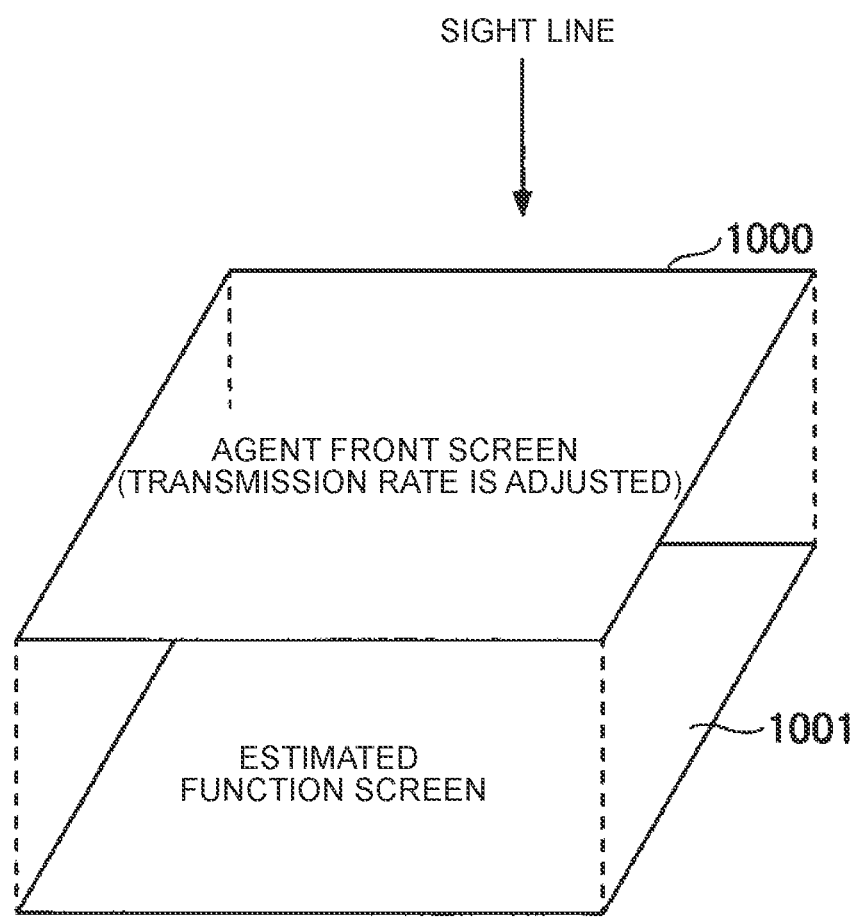
FIG. 8 is an example of an image that shows a relationship between an agent front screen and an estimated function screen.

FIG. 8 is an example of an image that shows a relationship between the agent front screen and the estimated function screen. As shown in FIG. 8, an agent front screen 1000 is disposed in front of an estimated function screen 1001 when seen in a direction of the user's sight line. That is, it is possible to adjust visibility of the estimated function screen 1001 that is disposed on the back of the front screen 1000 by controlling the transmission rate of the agent front screen 1000.

When the number of the estimated functions is large, the estimated functions have not been sufficiently narrowed down. Therefore, the transmission rate of the agent front screen 1000 is lowered to make the estimated function screen 1001 less visible, and thus, the user can recognize a situation where the estimated functions have not been sufficiently narrowed down. When the number of the estimated functions is small, the estimated functions have been sufficiently narrowed down. Therefore, the transmission rate of the agent front screen 1000 is increased to make the estimated function screen 1001 more visible, and thus, the user can recognize a situation where the estimated functions have been sufficiently narrowed down.

FIG. 9 is a transition diagram of an example of the screen that is displayed on the user terminal. (A) in FIG. 9 shows a screen example that is displayed on the user terminal 30 when the user calls (speaks to) the agent and the center 10 cannot estimate the function. Because the number of the estimated functions is "0" in (A) in FIG. 9, the estimated function screen is not disposed, and the transmission rate of the agent front screen is 0%.

(B) in FIG. 9 shows a screen example that is displayed on the user terminal 30 when the user asks the agent a "question regarding a recommended spot" and the number of the functions estimated by the center 10 is three. Because the number of the estimated functions is "3" in (B) in FIG. 9, a screen of a "navigation function" with the highest possibility of being used next is disposed on the back of the agent front screen at the transmission rate of "40%".

(C) in FIG. 9 shows a screen example that is displayed on the user terminal 30 when the user makes a "request to add a plan for tomorrow" to the agent and the number of the functions estimated by the center 10 is two. Because the number of the estimated functions is "2" in (C) in FIG. 9, the screen of the "navigation function" with the highest possibility of being used next is disposed on the back of the agent front screen at the transmission rate of "60%".

(D) in FIG. 9 shows a screen example that is displayed on the user terminal 30 when the user makes a "request to set departure time and navigation" to the agent and the number of the functions estimated by the center 10 is one. Because the number of the estimated functions is "1" in (D) in FIG. 9, the screen of the estimated "navigation function" is disposed on the back of the agent front screen at the transmission rate of "80%".

As it has been described so far, in this embodiment, a display mode of the estimated function screen (i.e., a mode in which the estimated function screen is displayed) is changed in accordance with the transmission rate of the agent front screen, so as to indicate the situation regarding narrowing down of the estimated functions (for example, the situation where the estimated functions have not been narrowed down, or the situation where the estimated functions have been narrowed down). However, the disclosure is not limited to this example, and the situation regarding narrowing down of the estimated functions may be indicated by a shape, animation, morphing (transformation), a color, or a change in size of an icon.

In this embodiment, when the agent cooperates with the various functions, the agent screen is set as the front screen, and the estimated function screen is made visible through the front screen. Thus, the screen is not frequently switched, and accordingly, confusion of the user is prevented, and it is possible to perform a recommendation operation that can be easily comprehended by the user.

The disclosure is not limited to the above-described embodiment, and various changes and modifications may be made to the above-described embodiment without departing from the scope of the disclosure. The processing such as the voice recognition processing and the intention comprehension processing executed by the center 10 in the information processing system 1 according to the embodiment of the disclosure may be executed by the component other than the center 10 and may be executed by, for example, the on-board device 22 or the user terminal 30.

Note that the input content reception unit 101 is an example of the reception unit described in the disclosure. The front screen 1000 is an example of the first screen. The agent screen control unit 105 is an example of the first screen control unit. The estimated function screen 1001 is an example of the second screen. The transmission rate determination unit 104 is an example of the determination unit. The background screen control unit 106 is an example of the second screen control unit.

What is claimed is:

1. A non-transitory computer readable medium storing instructions that are executable by one or more processors and that cause the one or more processors to perform functions, comprising:
   receiving an input content from a user,
   displaying a content of a recommendation for the input content on a first screen,
   generating a second screen of a function estimated or determined from the content of the recommendation for the input content and to dispose the second screen on a back of the first screen,
   determining a display mode of the second screen such that the display mode of the second screen of the function estimated from the content of the recommendation for the input content is different from the display mode of the second screen of the function determined from the content of the recommendation for the input content, and
   changing a transmission rate of the first screen such that the display mode of the second screen is set to the determined display mode, the transmission rate of the first screen being determined in accordance with the number of the estimated or determined functions such that as the number of the estimated or determined functions increases, the transmission rate of the first screen decreases, and as the number of the estimated or determined functions decreases, the transmission rate of the first screen increases.

2. The non-transitory computer readable medium storing the program according to claim 1, further comprising, when there is a plurality of the functions estimated from the content of the recommendation, selecting a function with a highest possibility among the plurality of the functions, and generating the second screen of the selected function.

3. The non-transitory computer readable medium storing the program according to claim 1, wherein the input content from the user is displayed on the first screen and to display the content of the recommendation for the input content is displayed on the first screen.

4. An information processor comprising:
   an input device configured to receive an input content from a user; and
   a central processing unit configured to display a content of a recommendation for the input content on a first screen,
   the central processing unit being configured to generate a second screen of a function estimated or determined from the content of the recommendation for the input content and to dispose the second screen on a back of the first screen, and
   the central processing unit being configured to determine a display mode of the second screen such that the display mode of the second screen of the function estimated from the content of the recommendation for the input content is different from the display mode of the second screen of the function determined from the content of the recommendation for the input content,
   the central processing unit being the first screen control unit is configured to change a transmission rate of the first screen such that the display mode of the second screen is set to the display mode determined by the central processing unit, and
   the central processing unit being configured to determine the transmission rate of the first screen in accordance with the number of the estimated or determined function such that as the number of the estimated or determined functions increases, the transmission rate of the first screen decreases, and as the number of the estimated or determined functions decreases, the transmission rate of the first screen increases.

5. A screen display method comprising:
   causing a computer to execute:
   a reception procedure of receiving an input content from a user;
   a first screen control procedure of displaying a content of a recommendation for the input content on a first screen;
   a second screen control procedure of generating a second screen of a function estimated or determined from the content of the recommendation for the input content and disposing the second screen on a back of the first screen; and
   a determination procedure of determining a display mode of the second screen such that the display mode of the second screen of the function estimated from the content of the recommendation for the input content is different from the display mode of the second screen of the function determined from the content of the recommendation for the input content, wherein
   in the first screen control procedure, a transmission rate of the first screen is changed such that the display mode of the second screen is set to the display mode determined in the determination procedure, the transmission rate of the first screen being determined in accordance with the number of the estimated or determined functions such that as the number of the estimated or determined functions increases, the transmission rate of the first screen decreases, and as the number of the estimated or determined functions decreases, the transmission rate of the first screen increases.

* * * * *